US012348101B2

(12) United States Patent
D'Amico et al.

(10) Patent No.: US 12,348,101 B2
(45) Date of Patent: Jul. 1, 2025

(54) STATOR COMPRISING AN INTERCONNECTOR

(71) Applicant: VALEO EQUIPEMENTS ELECTRIQUES MOTEUR, Creteil (FR)

(72) Inventors: Mathieu D'Amico, Creteil (FR); Christopher Riche, Creteil (FR)

(73) Assignee: VALEO EQUIPEMENTS ELECTRIQUES MOTEUR, Creteil (FR)

(*) Notice: Subject to any disclaimer, the term of this patent is extended or adjusted under 35 U.S.C. 154(b) by 121 days.

(21) Appl. No.: 17/782,838

(22) PCT Filed: Dec. 17, 2020

(86) PCT No.: PCT/EP2020/086722
§ 371 (c)(1),
(2) Date: Jun. 6, 2022

(87) PCT Pub. No.: WO2021/122959
PCT Pub. Date: Jun. 24, 2021

(65) Prior Publication Data
US 2023/0006494 A1    Jan. 5, 2023

(30) Foreign Application Priority Data
Dec. 20, 2019   (FR) .................................... 19 15099

(51) Int. Cl.
*H02K 3/50*         (2006.01)
*H02K 3/38*         (2006.01)

(52) U.S. Cl.
CPC ................. *H02K 3/50* (2013.01); *H02K 3/38* (2013.01); *H02K 2203/09* (2013.01)

(58) Field of Classification Search
CPC ......... H02K 3/50; H02K 3/38; H02K 2203/09
(Continued)

(56) References Cited

U.S. PATENT DOCUMENTS 10,998,789 B2 * 5/2021 Tategata ................... H02K 3/50
2014/0232223 A1   8/2014 Takasaki
(Continued)

FOREIGN PATENT DOCUMENTS

DE    11 2016 003 650 T5    5/2018
FR        3046505 A1        1/2016
(Continued)

OTHER PUBLICATIONS

International Search Report issued Mar. 9, 2021 in PCT/EP2020/086722 filed on Dec. 17, 2020, 2 pages.
(Continued)

*Primary Examiner* — Terrance L Kenerly
(74) *Attorney, Agent, or Firm* — Oblon, McClelland, Maier & Neustadt, L.L.P.

(57) ABSTRACT

A stator for a rotary electric machine including a stator body, a winding having at least one bundle axially projecting from the stator body and winding ends extending from the stator body. An interconnector is mounted on the winding, the interconnector including an insulating body and traces including trace ends extending from the insulating body, the winding ends being assembled on the trace ends, wherein the interconnector also includes at least one means for positioning the interconnector on the winding in a radial direction.

19 Claims, 4 Drawing Sheets

(58) Field of Classification Search
USPC .......................................................... 310/71
See application file for complete search history.

(56) References Cited

U.S. PATENT DOCUMENTS

| | | |
|---|---|---|
| 2017/0250588 A1 | 8/2017 | Kaiser et al. |
| 2018/0233985 A1 | 8/2018 | Haga et al. |
| 2021/0143699 A1* | 5/2021 | Alsman .................... H02K 3/28 |

FOREIGN PATENT DOCUMENTS

| | | |
|---|---|---|
| JP | 2019-9884 A | 1/2019 |
| JP | 2019-009884 A | 1/2019 |
| WO | WO 2013/045986 A2 | 4/2013 |
| WO | 2014-057978 A1 | 4/2014 |

OTHER PUBLICATIONS

Office Action issued Sep. 1, 2023, in corresponding Japanese Patent Application No. 2022-537501 (with English Translation), 8 pages.
Japanese Office Action mailed Sep. 1, 2023, issued in Japan Patent Application No. 2022-537501, 8 pages.
European Office Action mailed on Dec. 20, 2024, issued in European Patent Application No. 20 824 274.3, 8 pages.

\* cited by examiner

STATOR COMPRISING AN INTERCONNECTOR

TECHNICAL FIELD OF THE INVENTION

The technical field of the invention relates to a rotary electric machine, in particular for a motor vehicle, in which the installation of the interconnector is simplified.

The invention is applicable in the field of rotary electric machines such as alternators or reversible machines that can operate as an electric generator or an electric motor.

TECHNOLOGICAL BACKGROUND OF THE INVENTION

In a manner per se known, rotary electric machines comprise a stator and a rotor rigidly connected to a shaft. The rotor can be rigidly connected to a driving and/or driven shaft and can form part of a rotary electric machine in the form of an alternator, an electric motor or a reversible machine of the alternator-starter type that can operate in the two modes.

The stator is mounted in a housing configured to rotatably support the shaft on bearings by means of roller bearings. The rotor is, for example, of the "claw rotor" type, and comprises two pole wheels each having claws nested one inside the other in order to form the poles and a core, around which a rotor coil is wound. According to another example, the rotor comprises a body formed by a stack of layers of metal sheets held in the form of a packet by means of a suitable fastening system. The rotor comprises poles that are formed, for example, by permanent magnets housed in cavities provided in the magnetic mass of the rotor. Alternatively, in an architecture called salient pole architecture, the poles are formed by coils wound around arms of the rotor.

FIG. 1 shows a packet of metal sheets and a winding of a stator as a perspective view according to the prior art.

FIG. 2 shows part of the packet of metal sheets and the winding of the stator of FIG. 1 as a perspective view.

FIG. 3 shows a stator of FIGS. 1 and 2 further comprising an interconnector as a perspective view according to the prior art.

As shown in FIGS. 1, 2 and 3, the stator 100 comprises a stator body 110 formed by a stack of thin metal sheets forming a crown, the inner face of which is provided with slots 111 that are radially open inwardly in order to accommodate a winding 120 formed by phase windings. These phase windings of the winding 120 pass through the slots 111 of the stator body and form a bundle 125, 126 on either side of the stator body 110. The phase windings of the winding 120 are polyphase windings, connected as a star or a triangle shape, with one end of each phase winding of the winding forming a phase output 123 and each phase output 123 is connected to an electrical control module and the other end of each phase winding of the winding forms a connection point 122 that is either connected together in the case of a star-shaped assembly forming the neutral point or is connected to a phase output 123 of another winding in the case of a triangle-shaped assembly.

The phase windings of the winding 120 are obtained from conductive elements in the form of pins 121. A pin 121 has two branches connected by a curved head, or collateral portion, and the intermediate rectilinear portions, or central portions, of which are placed in two different slots that are angularly offset from each other by a predetermined angle. The heads of the pins 121 are twisted and form the upper bundle 125. The phase windings of the winding 120 in this example further comprise an end half-pin comprising a single branch. The upper bundle is provided with the ends of the half-pins forming the phase outputs and the connection points are neutral points in this example. The free ends of the branches of the pins are connected together, for example, by welding, and are twisted in order to form the lower bundle 126, namely the bundle downstream of the winding.

The pins 121 are electrically connected together. Two pins 121 of the same winding are directly connected together by welding, for example. In this example, each phase winding 120 comprises an inversion pin 130 connecting one end 121a of one pin to one end 121b of another pin of the winding, in particular of the same phase winding 120. In general, the inversion pins 130 are located above the upper bundle, i.e. in the axial extension of the winding, so as to connect two pins.

Each phase winding 120 therefore comprises two winding ends having a phase output 124 and a connection point 122. The winding therefore comprises a plurality of winding ends 124, 122. When the phase windings are connected as a star shape, the connection point is a neutral point. When the phase windings are connected as a triangle shape, the connection point is a point for connecting two separate windings in order to form the triangle connection. The stator winding therefore comprises a plurality of connection points 122 and a plurality of phase outputs 124 distributed along a periphery of the stator 100.

In the case of the star-shaped assembly, the connection points 122 of the same phase system must be connected together while ensuring electrical isolation with the phase outputs 124 in order to maintain the power supply to the stator winding. To this end, the stator 100 generally comprises an electrical connection component, also called an interconnector 140, that electrically connects the connection points 122 together while avoiding the phase outputs 124.

The interconnector is mounted on the winding. It comprises at least one trace having trace ends that are each electrically connected to one of the neutral points 122 of the winding in order to connect them together.

The footprint of the interconnector created a proximity between the housing (not shown) and the trace ends in particular. Such proximity generates a risk of contact between the housing and the trace ends leading to a short circuit.

In addition, assembling the interconnector with the winding requires precise installation, particularly radially, of the interconnector, as well as axially and angularly, and also requires that said component is properly held in position throughout the entire duration of the assembly method with the neutral points 122, which makes the manufacturing method difficult.

The radial direction is the direction transverse to the X-axis of the machine, and the axial direction is the direction of the X-axis of the machine.

An axial surface is understood to mean a surface that extends parallel to the axis of the machine. The axial surface can be cylindrical or flat, for example.

A radial surface is understood to mean a surface that extends in a plane perpendicular to the axis of the machine.

A winding end is understood to mean an end of a conductor of the winding, for example, a phase, a neutral, or even an end of a conductor changing the repeated profile of the winding, such as the end of an inversion half-pin.

The inner element, for two adjacent elements along the X-axis, is understood to mean the element closest to the axis and the outer element is understood to mean the element farthest from the axis. The lower surface will be the surface axially closest to the winding and the upper surface will be the surface axially farthest from the winding.

SUMMARY OF THE INVENTION

The invention provides a solution for maintaining the radial clearance between the interconnector and the housing, in particular, and for facilitating the operation involving assembling the interconnector with the winding.

In order to address the aforementioned problems, the applicant proposes a stator of a rotary electric machine in which the interconnector comprises means for positioning and for holding the position for the assembly operation.

According to a first aspect, the invention relates to a stator for a rotary electric machine comprising a stator body, a winding comprising at least one bundle axially projecting from the stator body and winding ends extending from the stator body, an interconnector mounted on the winding, the interconnector comprising an insulating body and traces comprising trace ends extending from the insulating body, the winding ends being assembled on the trace ends, characterized in that the interconnector also comprises at least one means for positioning the interconnector on the winding in a radial direction.

Positioning and holding the interconnector against the winding (bundle or inversion pin, etc.) allows both the necessary radial clearance to be provided between the trace ends and the housing and assists in holding the interconnector, particularly radially and angularly, during assembly by welding, for example.

In addition to the features that have just been mentioned in the previous paragraph, the stator according to one aspect of the invention can have one or more of the following additional features, considered individually or according to any technically possible combination:

According to one embodiment, the bundle comprises a bearing portion, the positioning means being a first positioning wall, with at least part of the first positioning wall being in radial abutment on the bearing portion.

According to one embodiment, the interconnector is axially positioned above the bundle, said first positioning wall at least partially extending by axially projecting from the insulating body toward the bundle, the axially projecting portion being in radial abutment on an axial end part of the bundle forming the bearing portion.

According to one embodiment, the axial end part of the bundle comprises inversion pins, the first positioning wall being in radial abutment on at least one pin.

According to one embodiment, a second positioning wall can be in abutment on the same pin.

According to one embodiment, the interconnector comprises at least three trace ends and a second wall, such that the positioning walls and the trace ends are angularly alternated along the interconnector.

According to one embodiment, the interconnector is symmetrical relative to a plane containing the X-axis and angularly intersecting the middle of the interconnector and a plane transverse to the X-axis and axially intersecting the interconnector.

According to one embodiment, the positioning means is a positioning lug radially extending from the interconnector body, the lug being adapted to engage with a tool for holding the interconnector in position on the winding.

According to one embodiment, the interconnector comprises a plurality of positioning pins.

The invention also relates to a rotary electric machine comprising a stator as previously described.

The invention also relates to a method for assembling an interconnector with a winding of a stator, wherein the interconnector comprises an insulating body, traces comprising trace ends extending from the insulating body, and at least one positioning wall for positioning the interconnector on the winding in a radial direction, and the stator comprises a stator body, and a winding comprising at least one bundle axially projecting from the stator body and winding ends extending from the stator body, the method comprising the steps of positioning the interconnector on the winding by positioning the wall in radial abutment on a bearing portion of the winding bundle, and of assembling at least one winding end with a trace end.

The invention also relates to a method for assembling an interconnector with a winding of a stator, wherein the interconnector comprises an insulating body, traces comprising trace ends extending from the insulating body, and at least one positioning lug radially extending from the interconnector body for positioning the interconnector on the winding in a radial direction, the stator comprising a stator body, and a winding comprising at least one bundle axially projecting from the stator body and winding ends extending from the stator body, the method comprising the steps of positioning the interconnector on the winding by assembling the lug with a tool for holding the interconnector in position on the winding, of assembling at least one winding end with a trace end, then of removing the tool.

The invention and its various applications will be better understood upon reading the following description and with reference to the accompanying figures.

BRIEF DESCRIPTION OF THE FIGURES

The figures are provided by way of a non-limiting example of the invention.

DETAILED DESCRIPTION

The figures are provided by way of a non-limiting example of the invention.

Embodiments of a rotary electric machine, in which the interconnector is a neutral point interconnector comprising two traces, an insulating body made of an electrically insulating material partially overmolded over the traces, is described in detail hereafter, with reference to the appended drawings. These embodiments illustrate the features and advantages of the invention. However, it should be noted that the invention is not limited to these embodiments. In particular, for example, the interconnector can comprise only one trace and can be an inverted interconnector, the trace ends of which are connected to two half-pins in order to form an inverted pin connected to two other pins of a winding, or even can be a phase interconnector for connecting two phase outputs of a winding with a star-shaped assembly. Throughout the remainder of the description, the neutral point interconnector is called interconnector.

In the figures, identical elements are identified using identical reference signs. For the sake of the readability of the figures, the size scales between elements shown in the figures are not followed.

Figure 1:
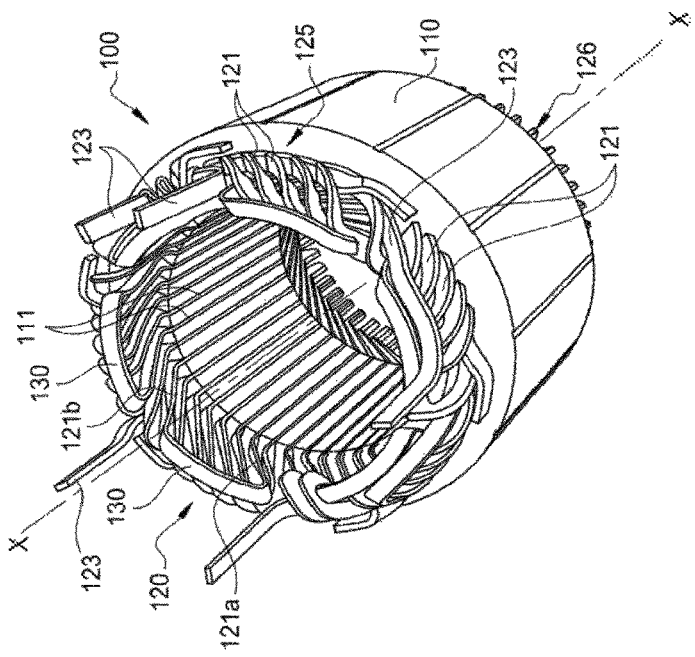
FIGS. 1, 2 and 3, already described, show a perspective view and a partial view of a stator winding according to the prior art.
Figure 2:
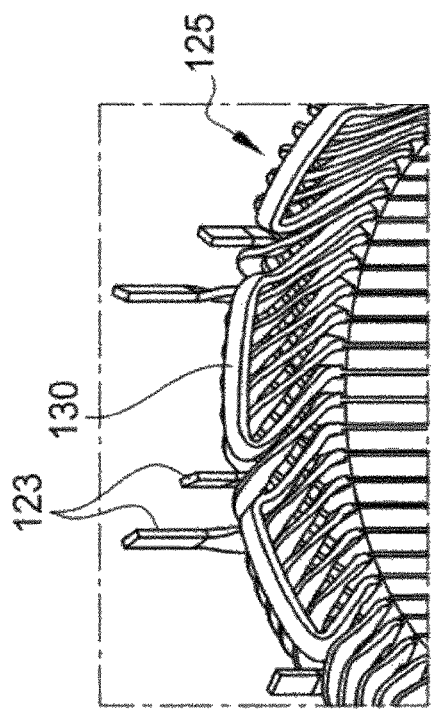
Figure 3:
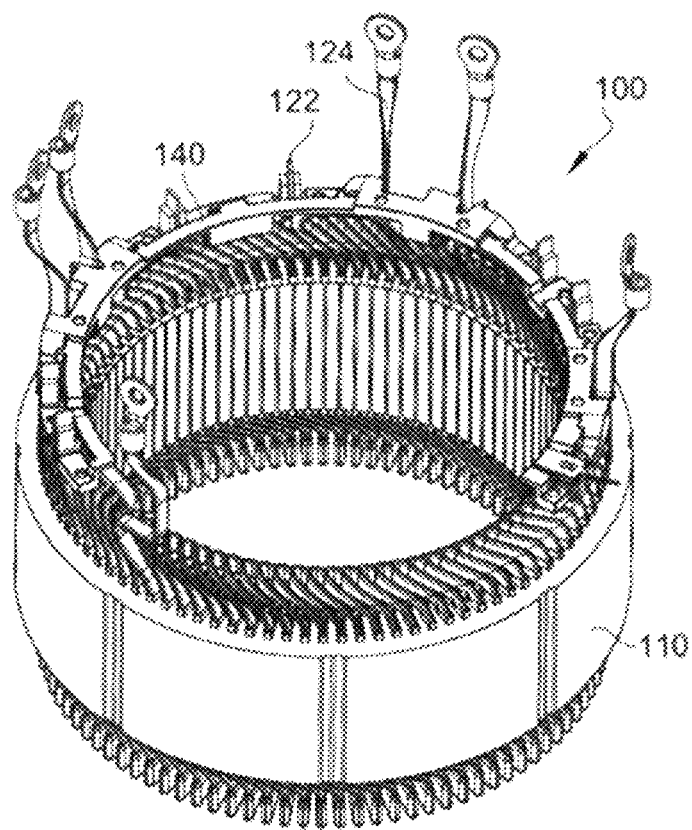
Figure 4:
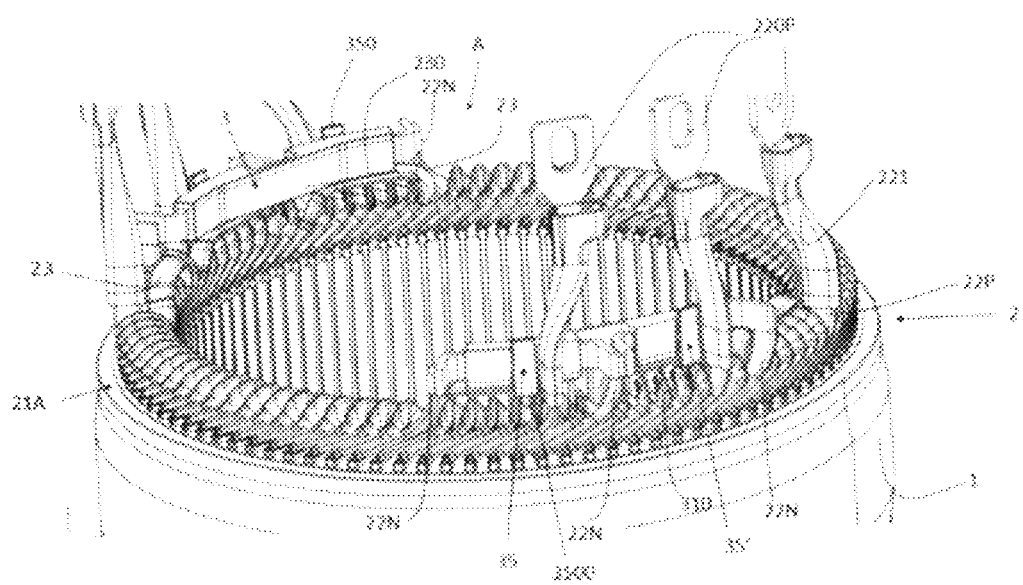
FIG. 4 shows a partial perspective view of a stator of a rotary electric machine according to one embodiment of the invention.

The rotary electric machine shown in FIG. 4 comprises an X-axis stator A comprising a stator body 1 passed through by conductors forming phase windings of a winding 2 of the stator A. The conductors are pins, for example. The winding also could be wired. As previously explained, the winding 2 comprises an upper bundle 21A and a lower bundle 21B (not shown) at each end of the stator body 1.

The winding 2 of the stator A comprises winding ends 22 (not shown in the figures) axially extending beyond the upper bundle 21A from the stator body 1, thus passing through the upper bundle 21A.

The winding 2 is a star-shaped winding, for example. The winding ends 22 comprise neutral points 22N and phase outputs 22P. The winding also could be a triangle-shaped winding.

According to an example shown in FIG. 4, each winding end 22 forming a phase output 22P is connected to a terminal 220p in order to be connected to an electronic power unit, but can also be directly connected to another power interconnector by welding, for example.

The winding ends 22 forming the phase outputs 22P particularly axially protrude from the interconnector 3 and are also insulated by an insulator 221.

In the example shown in FIG. 4, an interconnector 3 is mounted in the extension of the bundles 21A.

In the examples shown, the interconnector 3 is preferably positioned in the axial extension of the upper bundle 21A in order to limit the radial footprint, with it being understood that offset positions can be contemplated for advantages other than the footprint.

The interconnector 3 comprises one or more electrically conductive elements called traces 30, for example, made of copper, overmolded with an electrically insulating material forming an insulating casing, called insulating body 31.

In the illustrated embodiment, the interconnector 3 comprises two traces 30, each having two trace ends 300.

The traces 30, also called tracks, predominantly extend inside the insulating body 31 and the trace ends 300 are, outside said insulating body 31, electrically connected to the winding ends 22.

FIG. 4 shows greater details of the trace ends 300 of each of the traces 30 radially extending out of said insulating body 31 in order to each form the connection output with a neutral point 22N of a three-phase system.

Thus, the phase windings of the stator form, at each end thereof, a winding neutral point 22N, and these neutral points are connected to each other by means of the interconnector 3.

More specifically, each trace end 300 radially extends out of the body 31, forming an angle of the order of 90° with the insulating body 31. Each trace end 300 is connected, for example, by laser welding or electric welding, to a neutral point 22N. This radial extension of the trace ends 300 avoids any risk of damage to the insulating body 31 during the operations involving welding the neutral points. The trace end 300 can comprise a brazing filler alloy layer 301 to facilitate welding between the trace end 300 and the winding end 22.

A neutral point 22N can be connected between the trace ends 300 of two neighboring traces. As shown in this example, the two neighboring trace ends 300 of the two traces 30 extend out of the insulating body 31 substantially parallel to each other. One of the three winding ends forming a neutral point 22N is located between these two neighboring trace ends 300. The two ends of neighboring traces 300 are spaced apart from each other by a thickness of a winding end, in this case with a thickness of a neutral point pin or more in order to ensure assembly. The other two trace ends 300 farthest from each other are each connected to a corresponding neutral point 22N. A welding operation, for example, electric or laser welding, ensures the electrical connection between the neutral point 22N and each of the trace ends 300.

The insulating body 31 made of electrically insulating and heat-resistant material of the interconnector 3 of the winding can be positioned, as in the illustrated example, in abutment on the upper bundle 21A of the stator. The insulating body 31 comprises an upper radial bearing surface and a lower radial bearing surface, with the lower surface 310 being in contact with the bundle. Such positioning of the interconnector on the bundle of the winding allows the footprint generated by the presence of the interconnector 3 to be limited and allows the vibrations generated on said interconnector by the rotary electric machine to be limited.

The insulating body 31 also advantageously comprises an inner axial surface and an outer axial surface, with the trace ends 300 extending from the outer axial surface.

Figure 5:
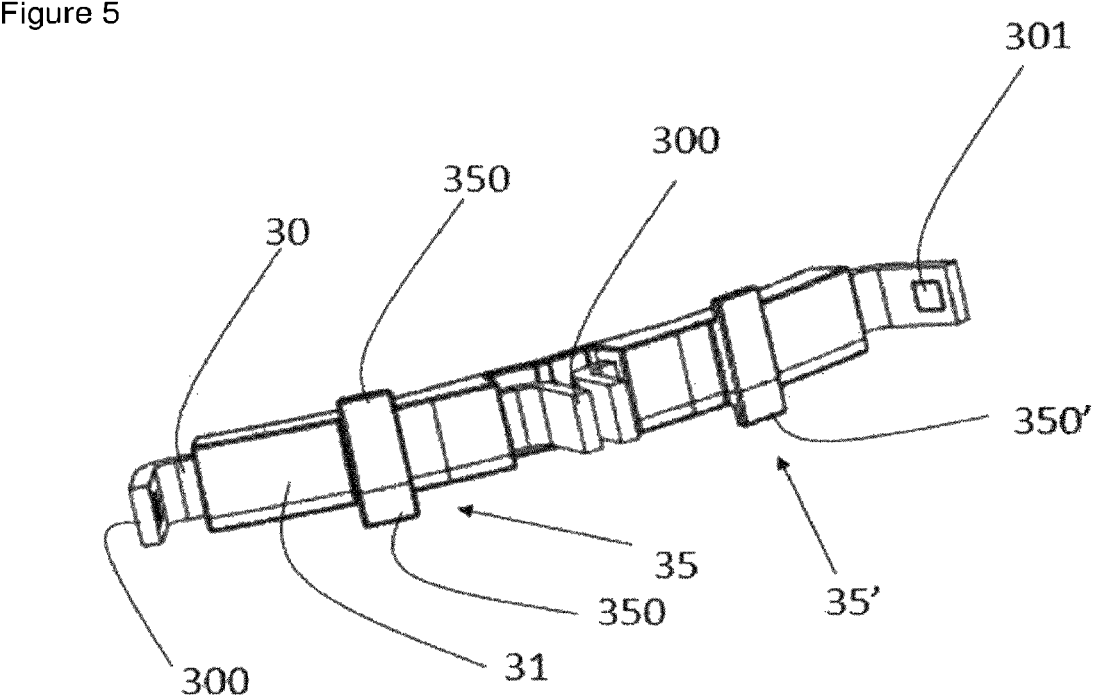
FIG. 5 shows a perspective view of the interconnector according to a first embodiment.

In a first embodiment, the positioning means 35 is a positioning wall. Such a wall is illustrated in FIG. 5. Said positioning wall 35 radially extends from the interconnector body 31. The wall extends by axially projecting relative to the interconnector body 31, at least toward the lower bearing surface 310, into a projecting portion 350. The wall can optionally axially extend on either side of the body 31. The wall advantageously radially extends from the outer axial surface of the interconnector body 31.

The projecting portion 350 comprises a bearing part 3500, illustrated in FIG. 4, in radial abutment on a bearing portion of the bundle 230. The bearing part of the bundle 230 is an inversion pin portion 23, for example. The bearing part 3500 has an axial surface in radial abutment on an axial surface of the pin. The lower radial surface 310 of the interconnector body is in axial abutment on a radial surface of the pin 230.

The positioning wall 35 is advantageously molded with the interconnector body, for example.

As an alternative embodiment for another type of winding, the positioning wall 35 is in radial abutment on an axial surface of an end part of the bundle forming a bearing portion 230 and the insulating body 31 is in axial abutment on a radial surface of an end part of the bundle 21A.

As an alternative embodiment of this embodiment, illustrated in FIG. 5, the interconnector 3 comprises two positioning walls 35, 35', for which at least one portion projecting from a positioning wall 350 comprises a bearing part 3500, as illustrated in FIG. 4, having an axial surface in radial abutment on an axial surface of a bearing portion 230 of the bundle.

In the case of a pin winding, the upper bundle 21A comprises two bearing portions 230 per three-phase system, formed by two of the three inversion pins 23 of the three-phase system. Each positioning wall 35, 35' comprises a bearing part 3500 in radial abutment on an axial surface of the corresponding pin bearing portion 230.

Given the footprint and thermal constraints in the case of a three-phase double system in particular, in which each of the six winding ends forming a neutral point 22N is assembled on at least one trace end of the interconnector, two interconnectors with a small angular extension are used instead of a single interconnector with a greater angular extension. Each small interconnector is used to connect one of the two three-phase systems.

The two interconnectors 3 are substantially positioned on either side of the circumference of the upper bundle 21A, as illustrated in FIG. 4, with each connecting three neutral points 22N. The term "connected" is understood to mean physically and not only electrically, in other words intended to be directly electrically connected without having to pass through other pins.

Each interconnector 3 is advantageously symmetrical relative to a plane containing the X-axis and angularly intersecting the middle of the interconnector 3 and a plane transverse to the X-axis and axially intersecting the interconnector 3. In other words, the traces 30, the trace ends 300, the insulating body 31, the positioning means(s) 35 are symmetrical relative to a plane containing the X-axis and angularly intersecting the middle of the interconnector and a plane transverse to the X-axis and axially intersecting the interconnector.

The two small interconnectors thus can be interchanged. In addition, since the interconnector 3 is reversible, mounting the interconnector on the winding will therefore be simplified.

Thus, the two radial surfaces 310 of the insulating body 31 of each one of the interconnectors 3 are symmetrical relative to a radial plane, with one of the two radial surfaces 310 being in axial abutment against the two bearing portions 230 of the two inversion pins 23, as previously described.

Each positioning wall 35 is symmetrical relative to a radial plane passing through the middle of the axially measured height of the interconnector 3. Thus, the interconnector 3 can be equally mounted on one side and on the other side in order to connect to the neutral point 22N of a three-phase system on the bundle.

In the case of two positioning means 35, they are also symmetrical relative to each other relative to an axial plane passing through the middle between the opposite trace ends 300, i.e. angularly intersecting in the middle thereof. Thus, the interconnector can be equally mounted on one side and on the other side on the bundle.

Figure 6:
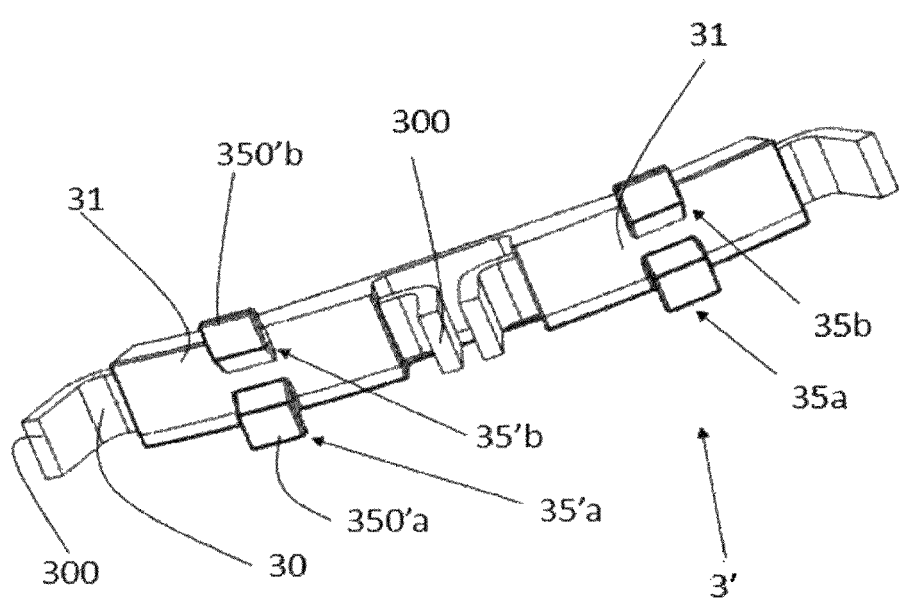
FIG. 6 shows a perspective view of the interconnector according to an alternative embodiment of the first embodiment.
Figure 7:
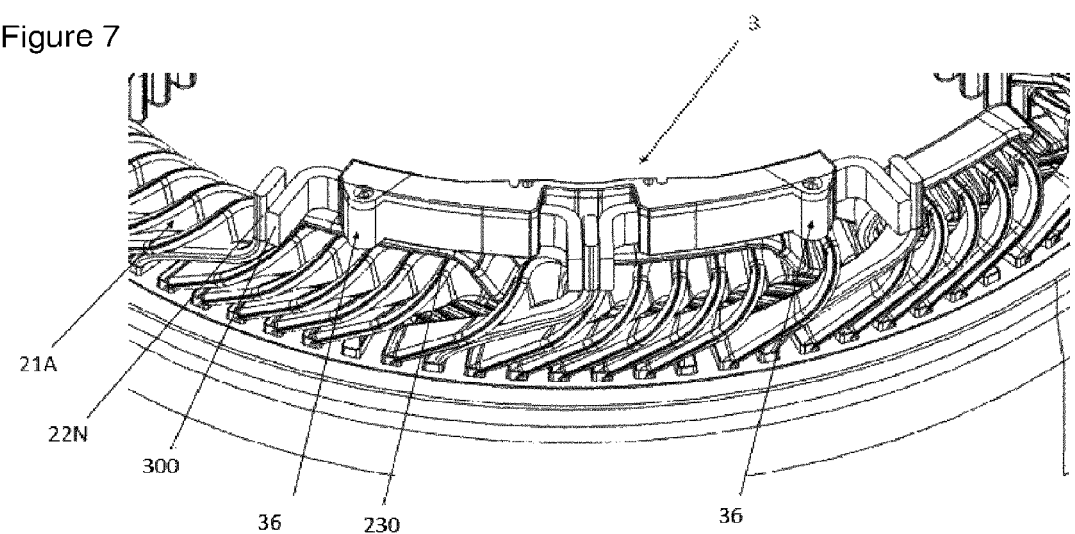
FIG. 7 shows a perspective view of the interconnector according to a second embodiment of the invention.

According to a second embodiment of the stator A shown in FIG. 6, the interconnector 3 comprises at least one positioning means 35 formed by a pair of positioning walls 35*a* and 35*b*.

The walls 35*a* and 35*b* are symmetrical relative to each other relative to the radial plane intersecting the interconnector body in the middle of the axial height thereof. Thus, the previously described symmetry for the interconnector is maintained.

When assembling the interconnector 3 with the winding 2, only one of the two walls 35*a* or 35*b* of a pair has its projecting portion 350 in contact with the bearing portion 230 of the bundle.

Each wall of the pair radially extends from the outer axial surface of the insulating body and extends by axially projecting relative to the interconnector body In this example, the interconnector 3 comprises two positioning means 35, 35' or two pairs of walls 35*a*, 35*b* and 35'*a*, 35'*b*. The two pairs are symmetrical relative to each other relative to an axial plane passing through the middle between the opposite trace ends 300.

In a third embodiment, the positioning means is a positioning lug 36 radially extending from the axial surface of the body 31 of the interconnector. The lug advantageously extends, for example, from the outer axial surface of the body, i.e. on the same side as the trace ends 300.

The lug 36 comprises a shape, for example, an opening, adapted to engage with a tool for holding the interconnector in position on the winding.

The lug 36 also can be symmetrical in a radial plane in order to allow the interconnector 3 to be held in two ways. The interconnector can also comprise two positioning pins that are symmetrical relative to an axial plane in order to allow it to be held with two branches of a tool in two ways, thereby simplifying the manufacture of the stator.

The method for assembling an interconnector 3 comprising at least one positioning wall 35 on the bundle comprises positioning the interconnector on the winding by positioning the trace ends 300 opposite the winding ends 22 forming the neutral points 22N of a three-phase system and the at least one wall in radial abutment on a bearing portion of the bundle of the winding, i.e. the bearing part 3500 of the wall 35, illustrated in FIG. 4, is radially in abutment against the bearing portion 230 of the inversion pin 23. Bearing the positioning wall 35 on the bearing portion 230 ensures that the clearance is provided between the casing in which the stator is mounted and the trace ends. A short-circuiting risk is thus avoided. The lower radial surface 310 of the insulating body 31 is also positioned against the radial surface 230 of two inversion pins 23. The interconnector 3 positioned thus is advantageously wedged and radially and axially positioned, which limits the risk of any offset between the interconnector 3 and the winding during assembly. The three winding ends forming the neutral points 22N of a three-phase system are assembled by connecting each of the two neutral points 22N of the three-phase system that are angularly farthest apart from each other to the trace ends 300 that are angularly farthest apart from each other and the neutral point 22N located between the other two neutral points 22N is connected to the two trace ends that are closest to each other.

In the case whereby the interconnector 3 comprises at least one positioning lug 36, the interconnector 3 is positioned on the winding 2 by assembling the lug 36 with a tool for holding and positioning the interconnector 3 on the winding. The assembly between the trace ends 300 and the neutral points 22N is then carried out before removing the tool.

The lug radially extending from the interconnector body advantageously can be replaced by a hole axially perforated in the body of the interconnector.

The above description focuses on a winding connected as a star shape. Of course, replacing the star-shaped coupling with a triangle-shape coupling does not depart from the scope of the invention, with the neutral points then being replaced by phase outputs 22P and the interconnector 3 is identical, for example, to that described except in that it comprises a single trace and two trace ends allowing two phase windings to be connected together in order to form the triangle connections.

Furthermore, whether a star- or triangle-shaped winding is involved, the inversion pins 23 can be produced by two conductors each comprising a winding end 22 connected to each other by means of an interconnector as described, except that it comprises a single trace and two trace ends. The conductors can be half-pins, such as those comprising neutral points and phases.

Even though it has been described by means of a certain number of examples, alternative embodiments and embodiments, the rotary electric machine according to the invention comprises various variations, modifications and improvements that will become clearly apparent to a person skilled in the art, with it being understood that these variations, modifications and improvements form part of the scope of the invention, as defined by the following claims. For example, replacing the plurality of welded together electrical conductors that form the winding with continuous wires with a round or rectangular cross-section does not depart from the scope of the invention.

Obviously, the invention will not be limited to the winding with pins, and can be applied to any type of winding.

The invention claimed is:

1. An X-axis stator for a rotary electric machine comprising:
   a stator body;
   a winding comprising at least one bundle axially projecting from the stator body and winding ends extending from the stator body;
   a interconnector mounted on the winding;
   the interconnector comprising an insulating body and traces comprising trace ends extending from the insulating body;
   the winding ends being assembled on the trace ends,
      wherein the interconnector also comprises at least one means for positioning the interconnector on the winding in a radial direction, and
      wherein the bundle comprises a bearing portion, the positioning means being a first positioning wall, with at least part of the first positioning wall being in radial abutment on the bearing portion.

2. The stator as claimed in claim 1, wherein the interconnector is axially positioned above the bundle, said first positioning wall at least partially axially extending by projecting from the insulating body toward the bundle, the axially projecting portion being in radial abutment on an axial end part of the bundle forming the bearing portion.

3. The stator as claimed claim 2, wherein the axial end part of the bundle comprises inversion pins, the first positioning wall being in radial abutment on at least one pin.

4. The stator as claimed in claim 3 and wherein the interconnector comprises at least three trace ends and a second wall, such that the positioning walls and the trace ends are angularly alternated along the interconnector.

5. The stator as claimed in claim 3, wherein the interconnector is symmetrical relative to a plane containing the X-axis and angularly intersecting the middle of the interconnector and a plane transverse to the X-axis and axially intersecting the interconnector.

6. A rotary electric machine comprising a stator as claimed in claim 3.

7. The stator as claimed in claim 2 and wherein the interconnector comprises at least three trace ends and a second wall, such that the positioning walls and the trace ends are angularly alternated along the interconnector.

8. The stator as claimed in claim 2, wherein the interconnector is symmetrical relative to a plane containing the X-axis and angularly intersecting the middle of the interconnector and a plane transverse to the X-axis and axially intersecting the interconnector.

9. A rotary electric machine comprising a stator as claimed in claim 2.

10. The stator as claimed in claim 1 and wherein the interconnector comprises at least three trace ends and a second wall, such that the positioning walls and the trace ends are angularly alternated along the interconnector.

11. The stator as claimed in claim 10, wherein the interconnector is symmetrical relative to a plane containing the X-axis and angularly intersecting the middle of the interconnector and a plane transverse to the X-axis and axially intersecting the interconnector.

12. A rotary electric machine comprising a stator as claimed in claim 10.

13. The stator as claimed in claim 1, wherein the interconnector is symmetrical relative to a plane containing the X-axis and angularly intersecting the middle of the interconnector and a plane transverse to the X-axis and axially intersecting the interconnector.

14. A rotary electric machine comprising a stator as claimed in claim 13.

15. The stator as claimed in claim 1, wherein the positioning means is a positioning lug radially extending from the interconnector body, the lug being adapted to engage with a tool for holding the interconnector in position on the winding.

16. A rotary electric machine comprising a stator as claimed in claim 15.

17. A rotary electric machine comprising a stator as claimed in claim 1.

18. A method for assembling an interconnector with a winding of a stator, the method comprising:
   providing the interconnector, which comprises an insulating body, traces comprising trace ends extending from the insulating body, and at least one positioning wall for positioning the interconnector on the winding in a radial direction;
   providing the stator which comprises a stator body, and a winding comprising at least one bundle axially projecting from the stator body and winding ends extending from the stator body;
   using a positioning tool to position the interconnector on the winding by positioning the wall in radial abutment on a bearing portion of the winding bundle;
   assembling at least one winding end with a trace end;
   removing the positioning tool.

19. A method for assembling an interconnector with a winding of a stator, wherein:
   providing the interconnector which comprises an insulating body, traces comprising trace ends extending from the insulating body, and at least one positioning lug radially extending from the interconnector body for positioning the interconnector on the winding in a radial direction;
   providing the stator which comprises a stator body, and a winding comprising at least one bundle axially projecting from the stator body and winding ends extending from the stator body;
   using a positioning tool to position the interconnector on the winding by assembling the lug with a tool for holding the interconnector in position on the winding;
   assembling at least one winding end with a trace end;
   removing the positioning tool.

* * * * *